United States Patent
Dajer et al.

(10) Patent No.: US 6,587,448 B1
(45) Date of Patent: Jul. 1, 2003

(54) RECONFIGURABLE WIRELESS SYSTEM BASE STATION

(75) Inventors: Miguel Dajer, Succasunna, Morris County, NJ (US); Claire Talkin Kerr, Morris Plains, Morris County, NJ (US); Peter Keith LaConte, West Paterson, Passaic County, NJ (US); Harvey Rubin, Morristown, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/420,278

(22) Filed: Oct. 18, 1999

(51) Int. Cl.$^7$ .................................................. H04Q 7/30
(52) U.S. Cl. ....................... 370/335; 455/550; 455/561; 455/422; 370/328; 370/337; 370/342; 370/347; 370/466
(58) Field of Search ................................. 455/550, 561, 455/562, 517, 557, 422, 525, 426, 403, 552; 370/342, 335, 337, 282, 278, 328, 347, 466

(56) References Cited

U.S. PATENT DOCUMENTS

| 5,592,480 A | 1/1997 | Carney et al. |
|---|---|---|
| 5,719,860 A | 2/1998 | Maison et al. |
| 5,768,268 A | 6/1998 | Kline et al. |
| 6,157,629 A | * 12/2000 | Jeon et al. ................... 370/355 |
| 6,282,184 B1 | * 8/2001 | Lehman et al. .............. 370/342 |

* cited by examiner

Primary Examiner—William Trost
Assistant Examiner—Keith Ferguson

(57) ABSTRACT

A reconfigurable base station suitable for supporting multiple wireless communication system standards includes a set of channel unit boards, each providing processing operations for user signals assigned to multiple carriers of the system, a set of a radio boards, each generating a radio frequency (RF) output signal for each of at least a subset of the multiple carriers, and a reconfigurable bus interconnecting the channel unit boards and radio boards. The base stations configured to support a particular wireless system standard, such as IS-95 CDMA, by assigning particular user signals to designated signal lines of the reconfigurable bus. The base station may then be reconfigured to support other CDMA standards, such as, e.g., IS-95C with or without Orthogonal to Transmit Diversity (QTD), Multi-Carrier (MC) cdma2009, or Universal Mobile Telecommunications System, (UMTS) by assigning. other user signals to the signal lines of the reconfigurable bus. The assignment of signal lines may be implemented dynamically under the control of software running on a base station control computer, or by establishing fixed connections between the bus signal lines and appropriate ports of the channel unit and radio boards.

22 Claims, 9 Drawing Sheets

RECONFIGURABLE WIRELESS SYSTEM BASE STATION

FIELD OF THE INVENTION

The present invention relates generally to base stations in code division multiple access (CDMA) wireless systems and other types of wireless communication systems, and more particularly to base stations capable of supporting multiple communication standards within such systems.

BACKGROUND OF THE INVENTION

The rapid pace of development in wireless communication systems has typically led to significant changes to the standards which define the operation of such systems. For example, the standards defining the operation of IS-95 CDMA wireless systems have progressed from TIA/EIA IS-95A to TIA/EIA IS-95B, and are now in the process of moving toward TIA/EIA IS-2000, also known as IS-95C. The IS-95A, IS-95B and IS-95C standards are collectively referred to herein as IS-95. Other CDMA standards, such as Multi-Carrier (MC) cdma2000 and the next-generation European standard known as Universal Mobile Telecommunication System (UMTS), are also being proposed.

These related standards each generally define an air interface specification that allows a mobile unit to communicate with a base station associated with a cell site. The interface definition typically includes a set of air interface channels, channel signal encoding rules, and signaling messages to enable the mobile unit to place and receive voice or data calls to and from a land line network, as well as to and from other mobile users. However, when the differences between successive generations of standards are significant, the base stations designed to support one standard often cannot easily be changed to support the next generation of the standard, thereby necessitating a new base station design. In many cases, this need for a new base station design arises because new air interface specifications require circuit packs in the base station to communicate different sets of signals than those communicated in accordance with a previous version of the standard. This situation will be illustrated in conjunction with FIGS. 1 and 2 below.

FIG. 1 shows an example of a base station 100 configured in accordance with the above-noted. IS-95 standard. The base station 100 includes a control computer 102, a control and traffic bus 104, and a set of M channel unit boards 106-i, i=1, 2, ... M. The control computer 102 interfaces with a mobile switching center (MSC) which provides a link to other base stations and to a public switched telephone network (PSTN). In an IS-95 CDMA system, spread spectrum digital signals from different user calls on a given base station antenna sector are added together to generate a composite spread spectrum digital signal for that sector. Individual spread spectrum digital signals are generated by channel elements, such as cell site modems (CSMs), that are part of the channel unit boards 106, and are combined to form the composite spread spectrum digital signal for a given sector. The base station design of FIG. 1 allows the channel unit boards 106 to communicate signals from one such board to the next in support of users on one CDMA carrier, designated C1, and up to three 120° antenna sectors, designated $\alpha, \beta$ and $\gamma$. Three sector systems are commonly used in practice, although omni-directional and two-sector systems may also be deployed. The use of a larger number of sectors, such as six sectors, is less common, but also possible.

Within each channel unit board 106-i in the base station 100 of FIG. 1, the spread spectrum digital signals of up to N users are added together on a per-sector basis. For each sector, the summed spread spectrum digital signals of users served by a particular channel unit board 106-i are added to the respective signals from the previous channel unit board, i.e., the channel unit board to its left in the FIG. 1 design. The summed digital signals are output from the channel unit board 106-i, and become inputs to the next-in-line channel unit board 106-(i+1) closer to a set of three radio boards 108-1, 108-2 and 108-3 in FIG. 1. Therefore, up to N users per channel unit board are added together by the mechanism of summing the signals from channel unit board to channel unit board. In a design with M such channel unit boards, each supporting up to N users, up to M×N total users can be supported on the three sectors $\alpha, \beta$ and $\gamma$. The interconnections between the channel unit boards are provided by a transmit digital'signal communications bus denoted Tx-bus.

It should be noted that although the description herein will be directed primarily to the transmit operations of the base stations, similar interconnection issues arise with respect to receive operations. The corresponding receive bus (Rx-bus) is omitted from FIG. 1 and other similar base station illustrations herein for purposes of clarity.

The digital processing elements on each of the channel unit boards 106-i can be used to support a user call on any of the three sectors $\alpha$, $\beta$ and $\gamma$. This capability is referred to as channel element pooling, and in the FIG. 1 design, is applied to one carrier and three sectors. Digital in-phase (I) and quadrature phase (Q) signals, for each of the three sectors $\alpha, \beta$ and $\gamma$ and the one CDMA carrier C1 are summed from channel unit board to channel unit board, and finally are passed to one of the three radio boards 108-1, 108-2 and 108-3, depending on the sector. Each radio board 108-1, 108-2 and 1,08-3 converts the digital I and Q signal inputs into an RF signal. The RF signals for sectors $\alpha$, $\beta$ and $\gamma$ are then amplified by power amplifiers 110- 1, 110-2 and 110-3, filtered in transmit filters 121-1, 112-2 and 112-3, and radiated by transmit antennas 114-1, 114-2 and 114-3, respectively. Other types of conventional techniques may be used to communicate signals among the channel unit boards, e.g., the I and Q signals for each sect or may be multiplexed onto one back plane trace.

A basic problem with conventional base station designs such as that shown in FIG. 1 is the configuration of the transmit digital signal communications bus (Tx-bus) that interconnects the channel units boards 106. More particularly, it is generally very difficult to be able to redefine the bus according to the particular version of the standard that is being implemented, and according to the set or subset of features that are to be provided in a specific configuration of a given base station. The Tx-bus also needs to be able to support the radio boards used in the base station, and these radio boards likewise need to be capable of interpreting the, communications bus signals in different ways, depending on configuration commands they receive from a control program. Although the digital processing boards and the radio boards may be hard wired for specific bus signal usage, several board design types would then be required to cover all versions of the standards.

FIG. 2 illustrates the manner in, which the FIG. 1 base station design can be extended to support an additional CDMA carrier C2. Since the IS-95A RF signal occupies a bandwidth of 1.25 MHz, it is possible and desirable for base stations to support multiple CDMA carriers. However, the base station design of FIG. 1 generally cannot simply incorporate additional channel unit boards 106 in a direct way to provide service on the second CDMA carrier C2. Instead, the board interconnect structure of FIG. 1 needs to be completely replicated, in the manner show in FIG. 2, in order to provides service on the second carrier C2. The FIG. 2 base station 100' therefore includes an additional set Of channel unit boards 116-1, . . . 116-M. The base station 100' also includes an additional set of radio boards 118-1, 118-2 and 118-3, power amplifiers 120-1, 120-2 and 120-3, and filters 122-1, 122-2 and 122-3, for processing signals associated with sectors α, β and γ, respectively, and carrier C2. In the base station 100', channel element pooling is restricted to each carrier C1 or C2, but across the three sectors α, β and γ on each carrier. In other words, channel element pooling does not extend across carriers. The base station 100' includes a pair of Tx-buses, each corresponding generally to the Tx-bus of FIG. 1.

The FIG. 1 base station design can be further extended in a similar manner to support more than two CDMA carriers. However, FIG. 2 illustrates that with respect to channel element pooling, the FIG. 1 design becomes non-extensible across carriers, such that a new base station design would be required in order to achieve a cross-carrier channel element pooling capability.

An example of the manner in which a change in standard can require a new base station design will now be provided with reference to FIGS. 3 and 4. The above-noted IS-95C standard in its current form incorporates new capabilities not found in its predecessor standards IS-95A and IS-95B, including a capability called Orthogonal Transmit Diversity (OTD) which offers additional system capacity under certain low mobility situations. With OTD, two sets of digital I and Q signals for each sector are created, are used to modulate a carrier frequency, and are radiated from different antennas.

FIG. 3 shows schematically the processing required in implementing OTD for a single call. A bit stream of a corresponding user signal on sector α is processed to form $I_1$ and $Q_1$ bit streams destined for one antenna of sector α, and $I_2$ and $Q_2$ bit streams destined for another antenna of sector α. A given bit in each group of four bits from the input bit stream is assigned to one of the bit streams $I_1$, $Q_1$, $I_2$ and $Q_2$. These streams are then multiplied in multipliers 151, 152, 153 and 154, respectively, by either a Walsh_a or Walsh_b 256-bit spreading code to generate corresponding spread signals which are processed through digital processing boards 160-1 and 160-2, radio boards 162-1 and 162-2 providing modulation with a carrier C, power amplifiers 164-1 and 164-2, and transmit filters 166-1 and 166-2, and then transmitted via sector α antennas 168-1 and 168-2.

FIG. 4 shows a base station 200 designed in a conventional manner to support the above-described OTD capability of IS-95C. The base station 200 includes control computer 102, control and traffic bus 104, and a set of M channel unit boards 206-i, i=1, 2, . . . M. Each of the M channel unit boards supports N users, and provides I and Q signals for each of first and second antennas of the sectors α, β and γ, i.e., for α1 and α2, for β1 and β2, and for γ1 and γ2. The base station 200 also includes sets of C1 radio boards 208, power amplifiers 21 0, transmit filters 212 and antennas 214, arranged as shown. Each of these sets includes a particular one of the C1 radio boards 208, power amplifiers 210, filters 212 and antennas 214, and supports a corresponding set of I and Q signals associated with a particular first or-second antenna of the sectors α, β and γ. The digital Tx-bus in this example includes a separate signal line for each of the I and Q signals associated with each of the first and second antennas of the antenna sectors αβ and γ.

By comparing the FIG. 4 base station design with the FIG. 1 design, it can be seen that the FIG. 1 design generally cannot be used to support OTD unless it is possible to multiplex two sets of I and Q signals on the back plane traces of the channel unit boards. While it may be possible to perform this type of multiplexing, the signal rates are likely to be high enough to make for an unstable design. In any event, such a design still does not allow channel element pooling across multiple CDMA carriers; Separate instances of the sets of elements 206, 208, 210 and 212 of the FIG. 4 design would therefore need to be completely replicated in a single base station to implement this type of pooling across multiple CDMA carriers.

Another example of the manner in which a change in standard can require a new base station design will now be described with reference to FIG. 5. A development effort is underway for a wide band CDMA system which includes a downlink, i.e., base-to-mobile, signal that is constructed from three contiguous IS-95 carriers. This is the so-called Multi-Carrier (MC) cdma2000 approach, which specifies a CDMA signal occupying approximately 5 MHz of spectrum. The cdma2000 downlink signal is shown in FIG. 5. Instead of the user signal being spread directly across the bandwidth occupied by three IS-95 contiguous carriers C1, C2 and C3, the signal is split into three appropriate parts, where each part is processed separately, converted to an IS-95-like spread spectrum digital signal, and then used to modulate one of the three IS-95 carriers C1, C2 and C3, which are transmitted simultaneously.

An advantage of the above-described MC cdma2000 approach is that wireless system operators with systems configured in accordance with IS-95A or IS-95B can provide a wide band service with relatively modest investment in new equipment, i.e., the RF components used for IS-95A or IS-95B service can be used simultaneously to provide the wide band service. However, despite the fact that the RF components can be reused, the interconnection of the digital components shown in FIG. 1 generally cannot be used to support the MC cdma2000 standards specification. A new base station design for the digital processing components would therefore be necessary, because the signals, from three CDMA IS-95 carriers on three sectors would have to be available to the channel unit boards. The MC cdma2000 channel unit boards differ from those used in IS-95 because of the different signal processing required.

Instead of using multiple IS-95 CDMA carriers to construct the above-described cdma2000 signal, the user signal could be directly spread with a code signal at three times the spreading rate used in IS-95A or IS-95B. A so-called Direct-Spread: (DS) signal is then created. However, the design of FIG. 1 cannot be used to implement a DS approach, unless it is possible to send the I and Q signals at three times the rate used for IS-95A or IS-95B. This is not likely for current base station designs. Consequently, a new base station design would therefore generally be required to implement the DS approach.

In order to avoid expensive and lengthy development processes, and to provide investment protection to purchasers of base station hardware, it is highly desirable that a base station design be easily upgradable to support subsequent versions of a communication standard. However, as illustrated above for the case of IS-95 CDMA, it has generally proved difficult to design base station equipment that is readily extensible when new capabilities are added to the standard. A need therefore exists for an improved base station design which overcomes the extensibility issues described above.

SUMMARY OF THE INVENTION

The present invention provides a reconfigurable base station which is designed to be readily extensible to accommodate changes in operating standards. Unlike the prior art base station designs described above, which generally utilize a separate communications bus for each CDMA carrier, a base station in accordance with the present invention includes a reconfigurable communications bus with signal paths that may be configured to accommodate many different combinations of signals associated with a particular arrangement of carriers, sectors and antennas. Particular user signals can be assigned to designated signal lines of the reconfigurable bus in order to support a particular wireless system.

In accordance with the invention, a reconfigurable base station suitable for supporting multiple wireless communication system standards includes a set of channel unit boards, each providing processing operations for user signals assigned to multiple carriers of the system, a set of radio boards, each generating an RF output signal for each of at least a subset of the multiple carriers, and a reconfigurable bus interconnecting the channel unit boards and radio boards. The base station is configured to support a particular wireless system standard, such as IS-95 CDMA, by assigning particular user signals to designated signal lines of the reconfigurable bus.

The base station may then be reconfigured to support other CDMA standards, such as, e.g., IS-95C with or without Orthogonal Transmit Diversity (OTD), Multi-Carrier (MC) cdma2000 or Universal Mobile Telecommunications System (UMTS), by assigning other user signals to the signal lines of,the reconfigurable bus. The assignment of signal lines may be implemented dynamically under the control of configuration commands generated by software running on abase station control computer and supplied to the channel unit boards and radio boards. As another example, the assignments may be implemented by establishing fixed connections between the bus signal lines and appropriate ports of the channel unit and radio boards.

Advantageously, the invention allows base station digital processing resources to be pooled across all the CDMA carriers in a given configuration. This pooling is generally not possible in the above-described conventional base station designs. In addition, the invention protects the investments of base station equipment purchasers, by allowing existing equipment to be easily and efficiently upgraded to support changes in operating standards. Furthermore, the invention allows the cost-effective and space-effective deployment of equipment meeting new standards, while also simultaneously providing support for older standards. These and other features and advantages of the present invention will become more apparent from the accompanying drawings and the following detailed description.

DETAILED DESCRIPTION OF THE INVENTION

The present invention will be illustrated below in conjunction with exemplary wireless communication systems. It should be understood, however, that the invention is not limited to use with any particular type of wireless system, but is instead more generally applicable to any wireless system in which it is desirable to provide reconfiguration capabilities in system base stations, such that the base stations can more readily accommodate upgrades or other changes in system operating standards. For example, although the techniques are illustrated with reference to systems configured in accordance with IS-95, cdma2000 and UMTS CDMA standards, it will be apparent to those skilled in the art that the techniques are also applicable to other CDMA wireless systems, as well as to other types of wireless systems, including narrowband analog wireless systems, time division multiple access (TDMA) wireless systems, Global System for Mobile Communications (GSM), etc.

The present invention provides an improved base station design which overcomes the extensibility issues described above. Illustrative embodiments of the invention described herein are reconfigurable to support multiple CDMA standards, including, e.g., existing standards such as IS-95A and IS-95B, as well as standards currently under development, such as IS-95C with or without OTD, MC cdma2000, and the European wide band CDMA standard known as UMTS. In addition, the illustrative embodiments permit channel element pooling not only across sectors, but also across all CDMA carriers. The reconfiguration may be implementing dynamically using control computer software, or alternatively may be implemented by providing different hard-wired connections within the channel unit boards and radio boards of the base station. The term "reconfigurable" as used herein is intended to include an arrangement which supports one or more of these and other types of configuration techniques.

As will be described in detail below in conjunction with FIGS. 6 through 9, a flexible base station design in accordance with the present invention comprises digital channel unit boards and radio boards that can be configured by software or hard-wired by design to process subsets of digital input signals in different ways, depending on the standard being implemented and the configuration and number of CDMA carriers that are desired. The software-configured or hard-wired designs define the types of signals to be carried on a Tx-bus that interconnects the channel unit boards and also the radio boards. The channel unit boards can be designed to support multiple versions of the CDMA standard, or there can be different designs for each version of the standard. Similarly, the radio boards can be designed to support multiple versions of the standards, or different radio board designs can be used.

Figure 1:
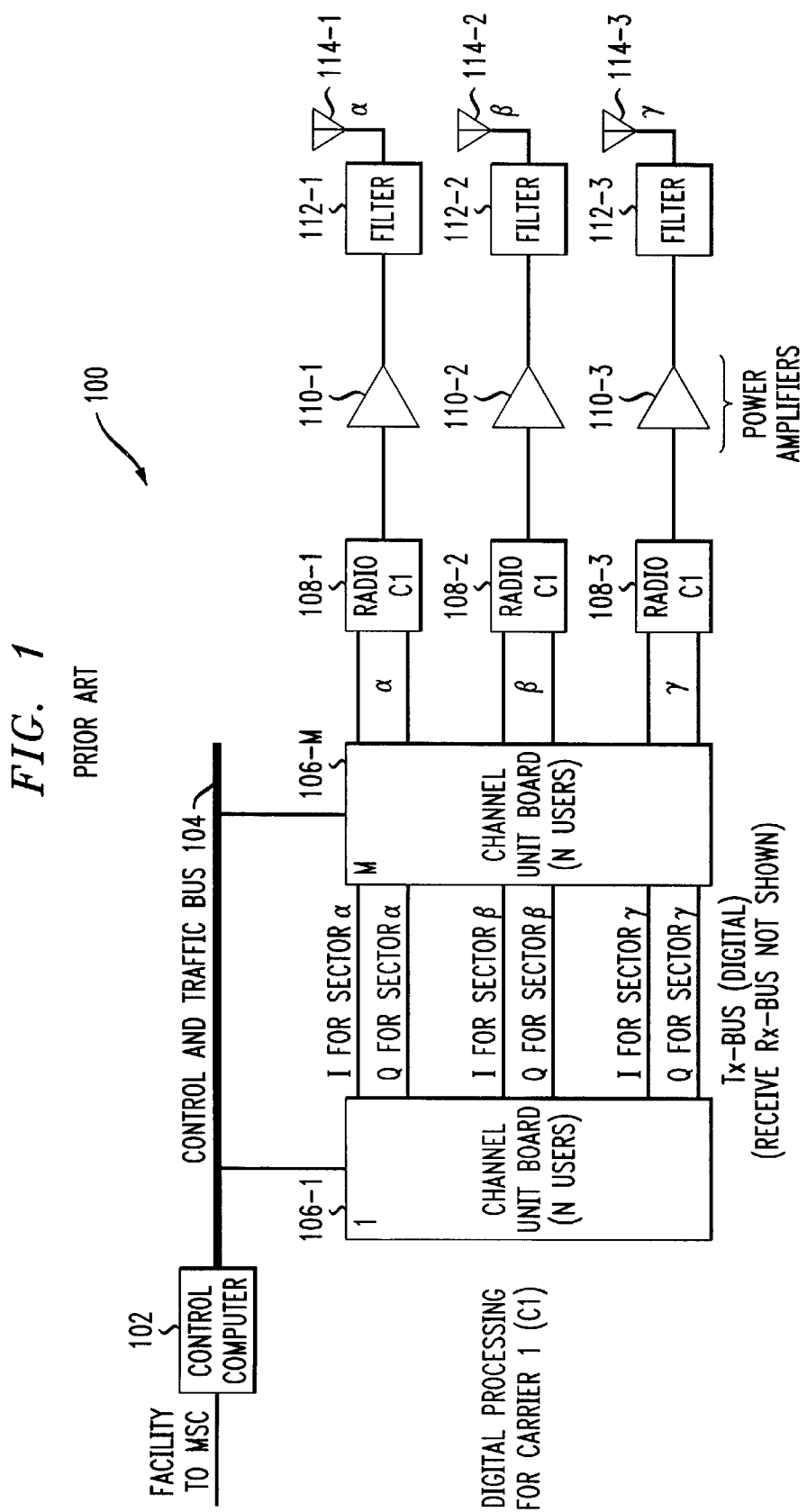
FIG. 1 shows an example of a conventional base station designed to support the IS-95 wireless communication standard.
Figure 2:
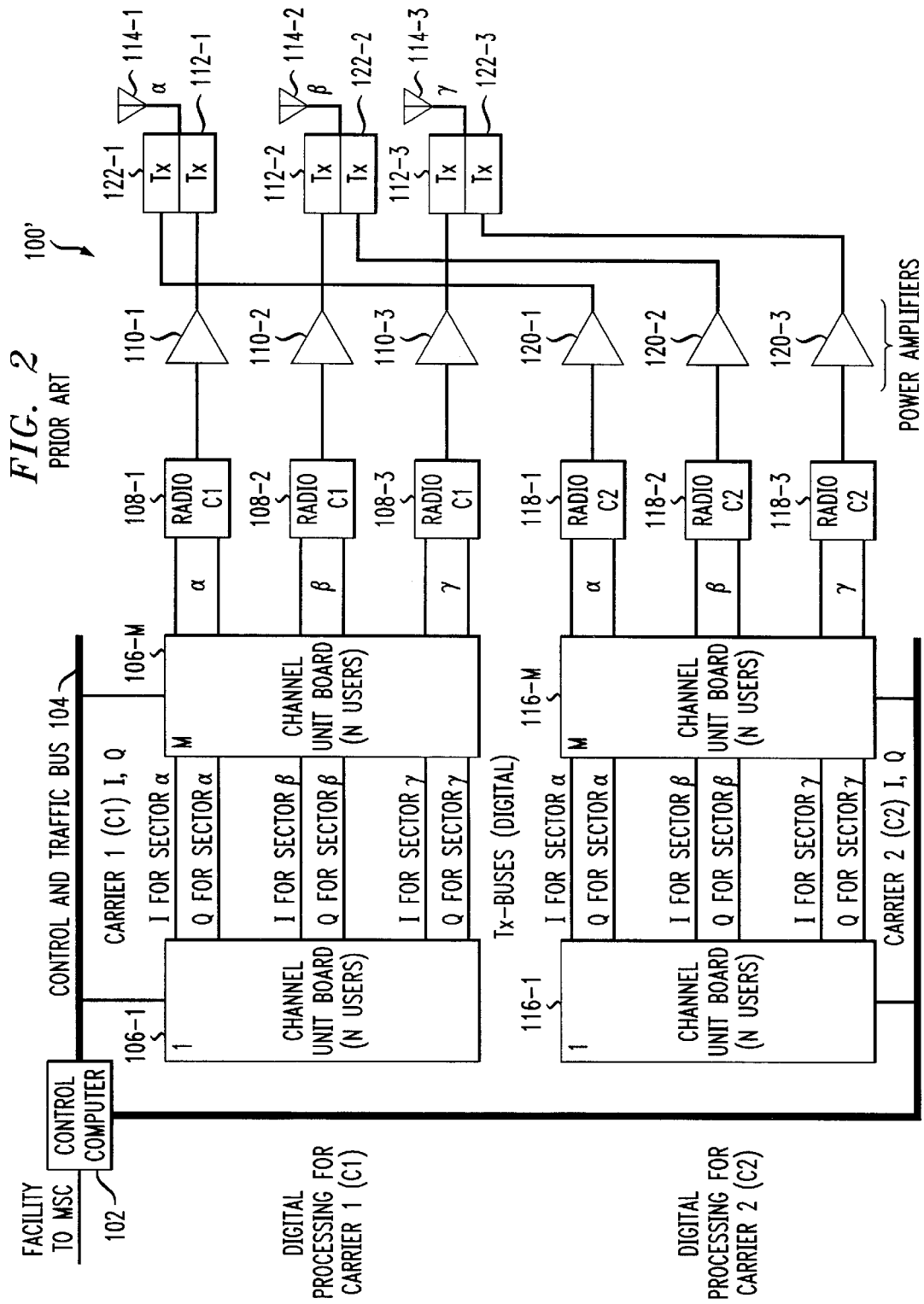
FIG. 2 illustrates a conventional manner for extending the FIG. 1 base station to support multiple IS-95 CDMA carriers.
Figure 3:
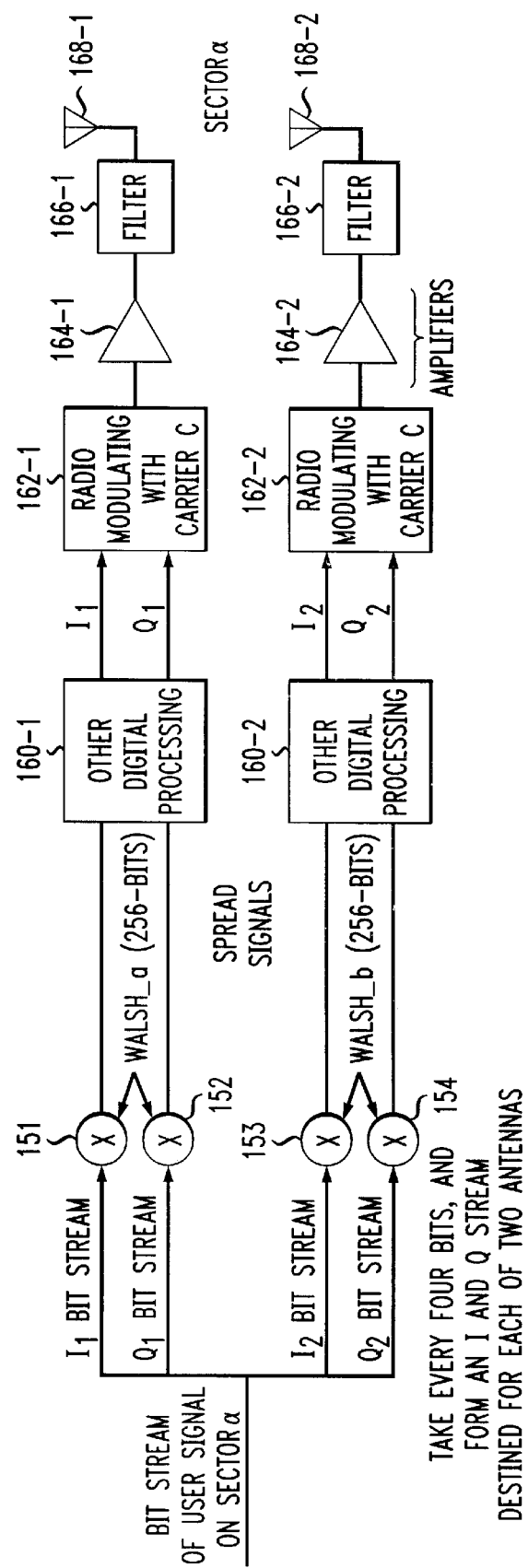
FIG. 3 illustrates an OTD approach that may be implemented in an IS-95 CDMA base station.
Figure 4:
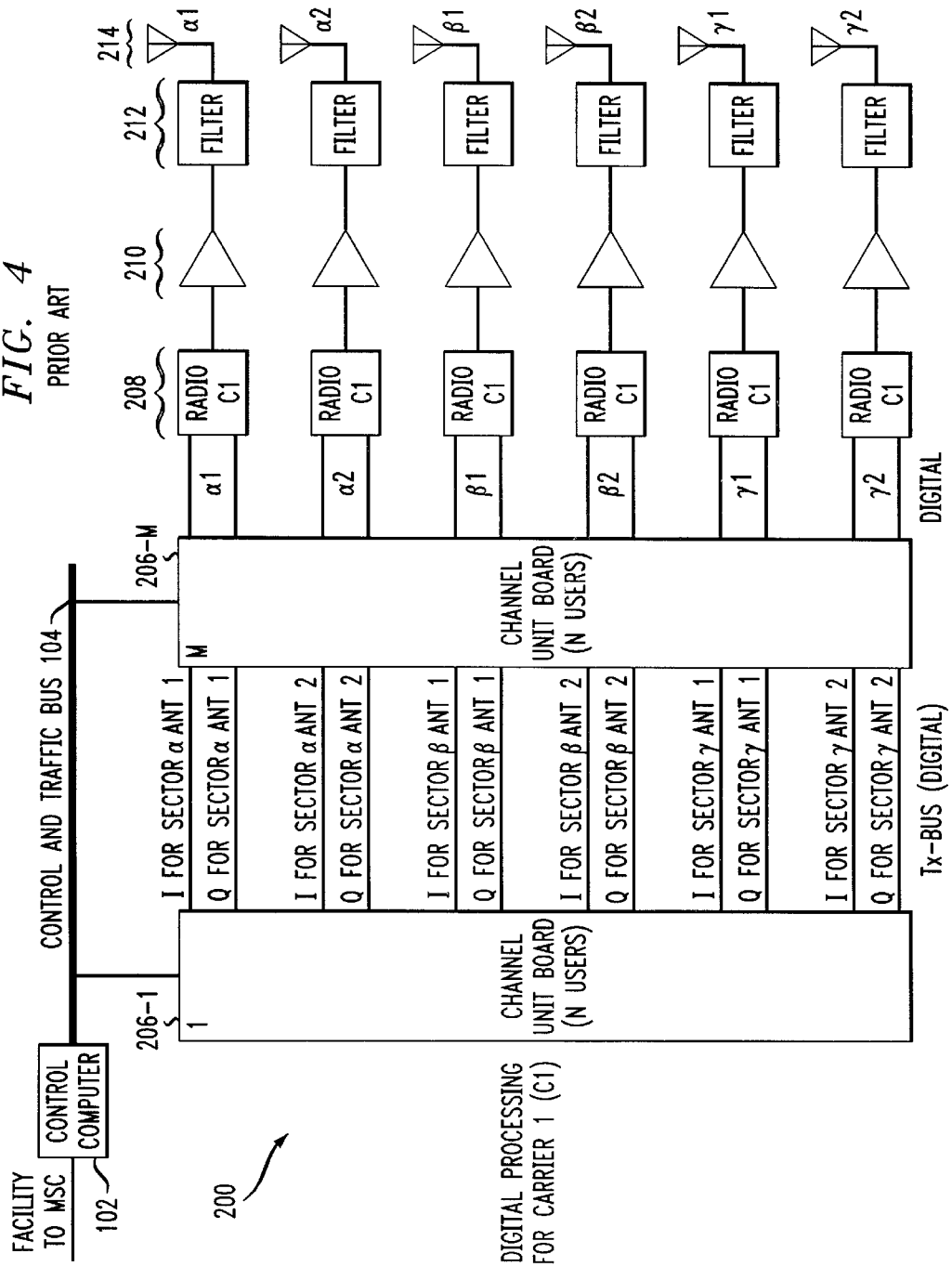
FIG. 4 shows a conventional base station for supporting the OTD approach of FIG. 3.
Figure 5:
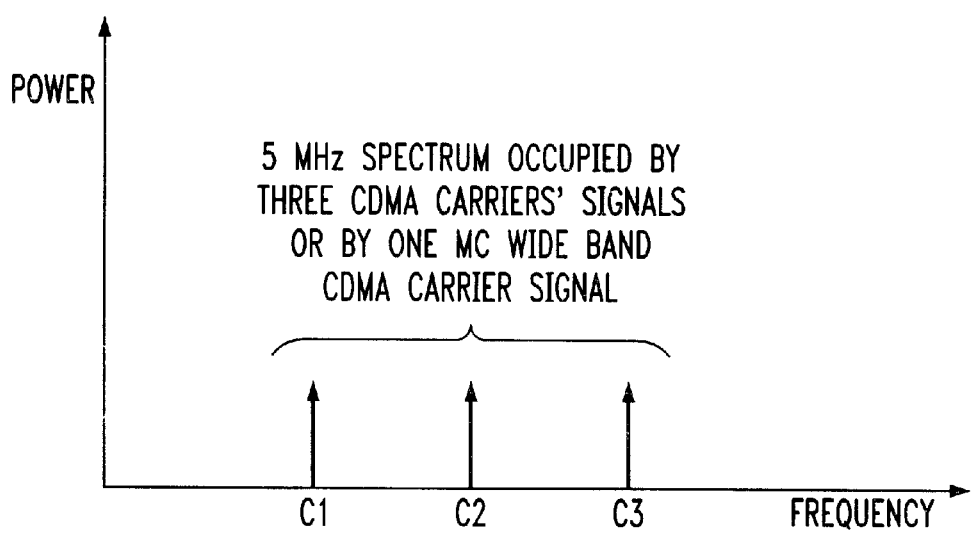
FIG. 5 illustrates a conventional MC approach that may be implemented in an IS-95 CDMA base station.
Figure 6:
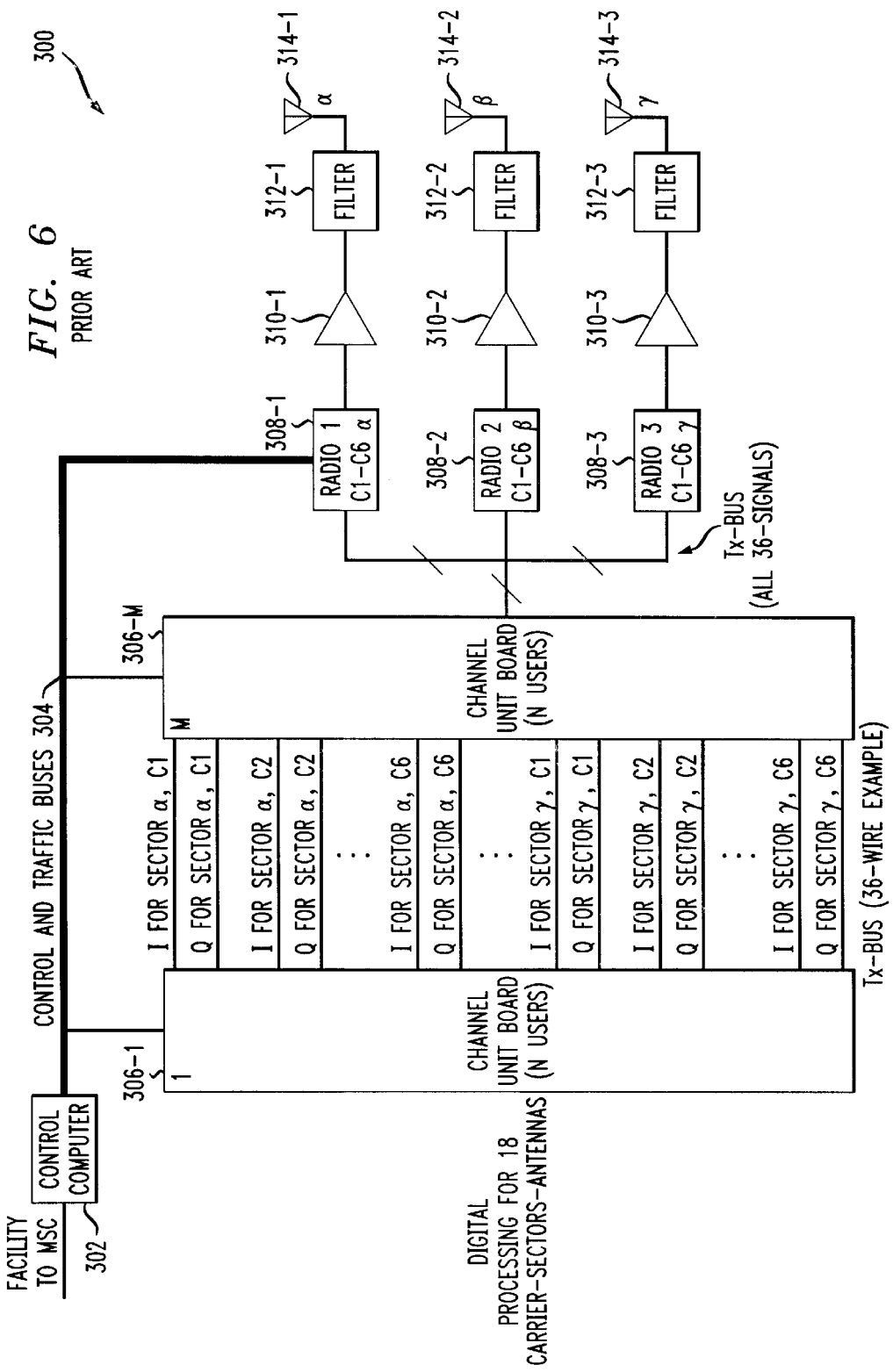
FIGS. 6 through 9 show different configurations of an illustrative embodiment of a reconfigurable base station in accordance with the invention.

FIG. 6 shows an illustrative embodiment of a base station 300 in accordance with the invention. The base station 300 includes a control computer 302, a set of control and traffic buses 304, and a set of M channel unit boards 306-i, i=1, 2, ... M. The control computer 302 interfaces with an MSC which provides a link to other base stations and to a PSTN. The base station 300 supports up to six CDMA carriers on three sectors α, β and γ. It should be noted that this arrangement is by way of example only, and that other embodiments could be configured to use different numbers of CDMA carriers and sectors, e.g., by appropriate alteration of the Tx-bus interconnecting the channel unit boards as' will be described in greater detail below. Advantageously, the FIG. 6 base station design allows the definition of signals carried on the Tx-bus to be altered through software or by the hard-wired design of a particular type of channel unit board, and thus provides a single base station design that can accommodate a multiplicity of different CDMA standards.

Each of the M digital channel unit boards 306 in FIG. 6 supports up to N user calls. The M digital channel boards are interconnected by a 36-wire Tx-bus configured to support up to 18 sector/carrier/antenna signal pairs. Therefore, the base station design of FIG. 6 accommodates six CDMA IS-95 carriers on three sectors, i.e., 18 sector-carrier pairs of I and Q signals without OTD, or three CDMA IS-95 carriers on three sectors and two antennas, i.e., 18 sector/carrier/antenna pairs of I and Q signals with OTD for each of the three CDMA carriers. These two different configurations are described in detail below.

In the present description, K refers to the number of carriers, S refers to the number of sectors, and A refers to the number of antennas.

The base station 300 is able to support K=6 CDMA carriers, C1 through C6, on S=3 sectors without OTD, because each of the 36 wires of the Tx-bus carries the digital I or Q signal for a particular carrier and a particular sector. It should be noted that different arrangements are possible for mapping the required signals onto the Tx-bus wires, and a different number of wires can be used in the Tx-bus. For example, every other I-bit and every other Q-bit for a given CDMA carrier and a particular sector can be carried on one wire, with a second wire carrying the other set of bits for I and Q for that carrier and sector. As another example, the I and Q digital signals for a given carrier and sector can be carried on a single wire, in which case only 18 wires are required in the Tx-bus to accommodate 18 sector/carrier/antenna pairs of I and Q signals. However, the required signal rate is increased by a factor of two.

The channel unit boards 306 are configured by software running on the control computer 302 to place all user digital I signals and Q signals for CDMA carrier C1 and sector α onto the first two Tx-bus wires; and to place user signals for other sectors and other CDMA carriers onto the remaining Tx-bus wires in an analogous manner, as illustrated in FIG. 6. For a user call on any CDMA carrier and on any sector, the channel unit boards 306 place the user I and Q signals onto the Tx-bus wires associated with that carrier and sector. The base station design of FIG. 6 thus achieves channel element pooling across 6 carriers as well as across 3 sectors. As previously noted, this design can be extended to include any number of CDMA carriers and sectors. In practical designs, however, there is typically a limit to the number of wires that can be used on the Tx-bus, and therefore a limit to the total number of sectors/carriers/antennas that can be supported. Factors such as the total, number of pins available to channel unit boards and the maximum bus clock rate may be important in determining this limit.

The base station 300 of FIG. 6 includes radio boards 308-1, 308-2 and 308-3, each of which has access to all of the signals of the Tx-bus. The boards 308-1, 308-2 and 308-3 in this embodiment each process signals for up to six carriers per sector and provide up to two composite low-power RF output signals. For example, each of the radio boards can provide a single RF output for six carriers C1 through C6 and one sector α, β or γ, or two RF outputs, each for three carriers on one sector for either antenna-1 or antenna-2, etc.

The base station 300 is configured for operation with six carriers on three sectors by the above-noted software running on the control computer 302, which configures the radio boards 308-1, 308-2 and 308-3 to process specific sets of Tx-bus signals. For example, radio board 308-1 in FIG. 6 is configured to process digital I and Q signals from the Tx-bus that correspond to carriers C1, C2, C3, C4, C5, and C6. Its output is a low-power RF signal that includes the combined modulation for all six carriers for sector α. This output is fed to an RF power amplifier 310-1 handling the α sector. Similarly, radio board 308-2 is configured to handle the Tx-bus I and Q signals for all six carriers C1 through C6 for sector β, and radio board 308-3 is configured to handle the Tx-bus I and Q signals for all six carriers for sector γ.

Figure 7:
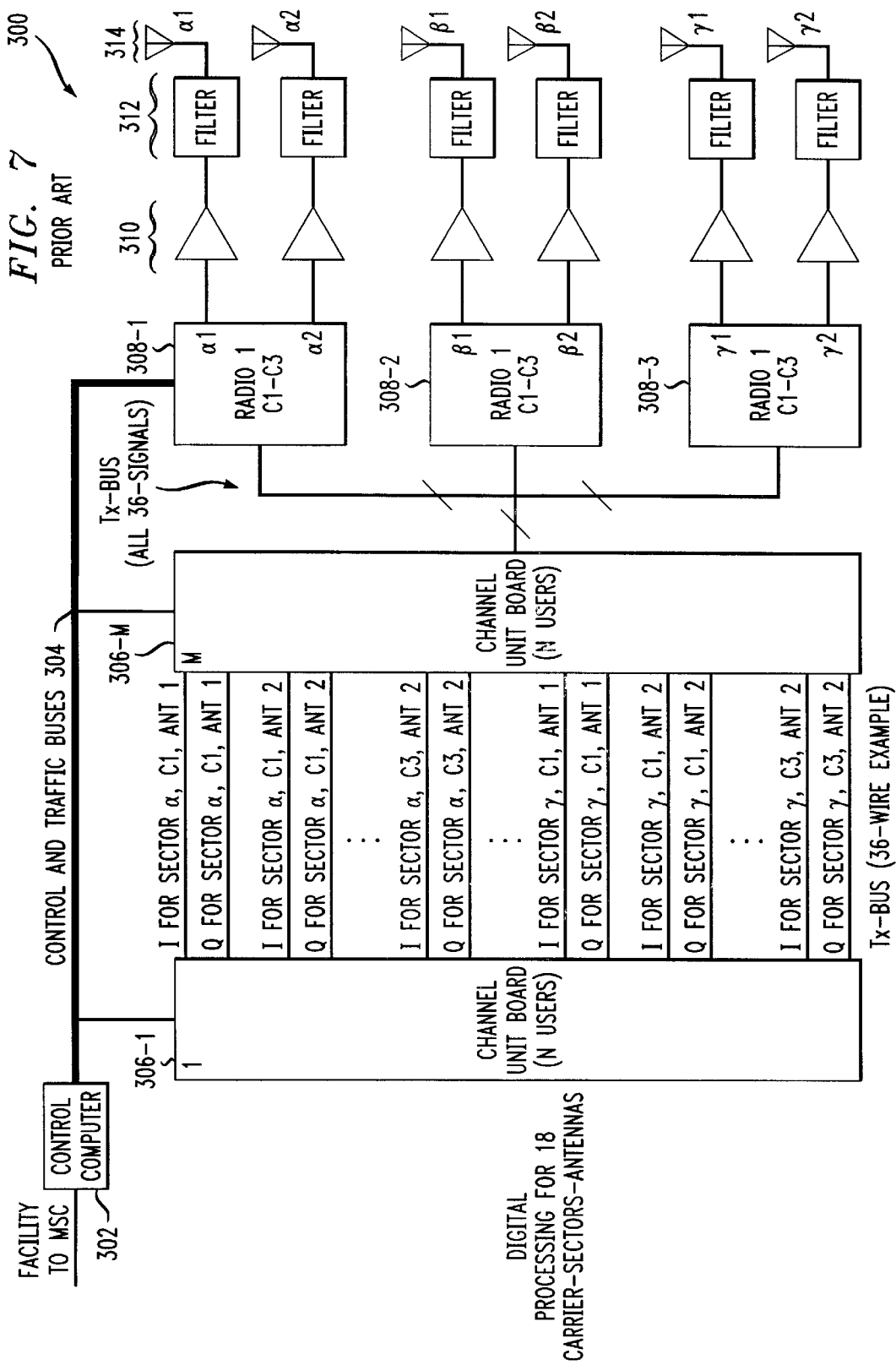

It should be noted that other radio board arrangements are possible. For example, although the FIG. 6 design includes three radio boards, another possible embodiment may use six radio boards, each providing three sector/carriers of processing and a single RF output. In addition, the connection of the radio boards to the channel unit boards may be via a fiber interface. For example, the digital Tx-bus signals may be multiplexed onto a fiber interface from a back plane where the channel unit boards are located. The signals are carried via fiber to the radio board location, and demultiplexed there;

FIG. 7 shows the base station 300 as configured to provide the above-described OTD capability for a given CDMA carrier. In this embodiment, the channel, unit boards 306 are configured to provide as outputs a set of digital I and Q signals separately for each of A=2 antennas in each of the sectors α, β and γ. Each OTD CDMA carrier thus takes the Tx-bus capacity consumed by two non-OTD CDMA carriers. Therefore, the base station 300 is capable of providing up to three OTD CDMA carriers on three sectors.

The base station 300 is configured in this manner by the software running on the control computer, which assigns signals to particular wires of the Tx-bus as follows. One Tx-bus wire carries the digital I signals of users on CDMA carrier C1, sector α, for antenna α1. A second Tx-bus wire carries the digital Q signals of users on CDMA carrier C1, sector α, for antenna α1. A third Tx-bus wire carriers the digital I signals of users on CDMA carrier C1, sector α, for antenna α2. A fourth Tx-bus wire carries the digital Q signals of users on CDMA carrier 1, sector α, for antenna α2. A similar configuration of Tx-bus usage is defined for the I and Q signals for users on CDMA carrier 1, sectors β and γ, and for the other two CDMA carriers, for sectors α, β and γ. Other mappings of I and Q signals onto the Tx-bus wires are possible.

Radio board 308-1 in FIG. 7 is configured to process all the summed digital I and Q signals for sector α antennas α1 and α2. Similarly, radio board 308-2 is configured to process the summed digital I and Q signals for sector β antennas β1 and β2, and radio board 308-3 is configured to process all the I and Q signals for sector γ antennas γ1 and γ2. Each radio board 308-1, 308-2 and 308-3 outputs low-power composite RF signals for the three CDMA carriers for both antennas for a particular sector. These low-power RF signals are each amplified in one of six power amplifiers 310, filtered in one of six transmit filters 312, and radiated from one of six antennas 314, i.e., one of the antennas α1, α2, β1, β2, γ1 and γ2.

As another example of the flexibility provided by the base station 300, it may be reconfigured to provide one CDMA IS-95C carrier with OTD, and four CDMA carriers without OTD. This configuration is provided by programming a subset of the channel unit boards 306 to operate in an OTD mode. The first 12 wires of the Tx-bus are configured to provide OTD in the manner previously described, i.e., for each of three sectors, one wire for the I signal and one wire for the Q signal for each of two antennas. The remaining 24 wires in the exemplary 36-wire Tx-bus are used to support four CDMA, carriers without OTD, i.e., for each of three sectors, and for each of four carriers, one wire for the I signal, and one for the Q signal. Of course, numerous other configurations are possible as well, e.g., two CDMA carriers with OTD and two without. The base station 300 can also be configured to allow implementation of the previously-described Multi-Carrier (MC) or Direct-Spread (DS) cdma2000 approaches. The signal bandwidth in either case requires the equivalent usage of three IS-95 CDMA carriers. Therefore, 18 of the 36 wires of the Tx-bus in base station 300 are reserved for one wideband CDMA carrier. The remaining 18 wires of the Tx-bus can be configured to support up to three additional IS-95 carriers, or a second cdma2000 carrier.

Figure 8:
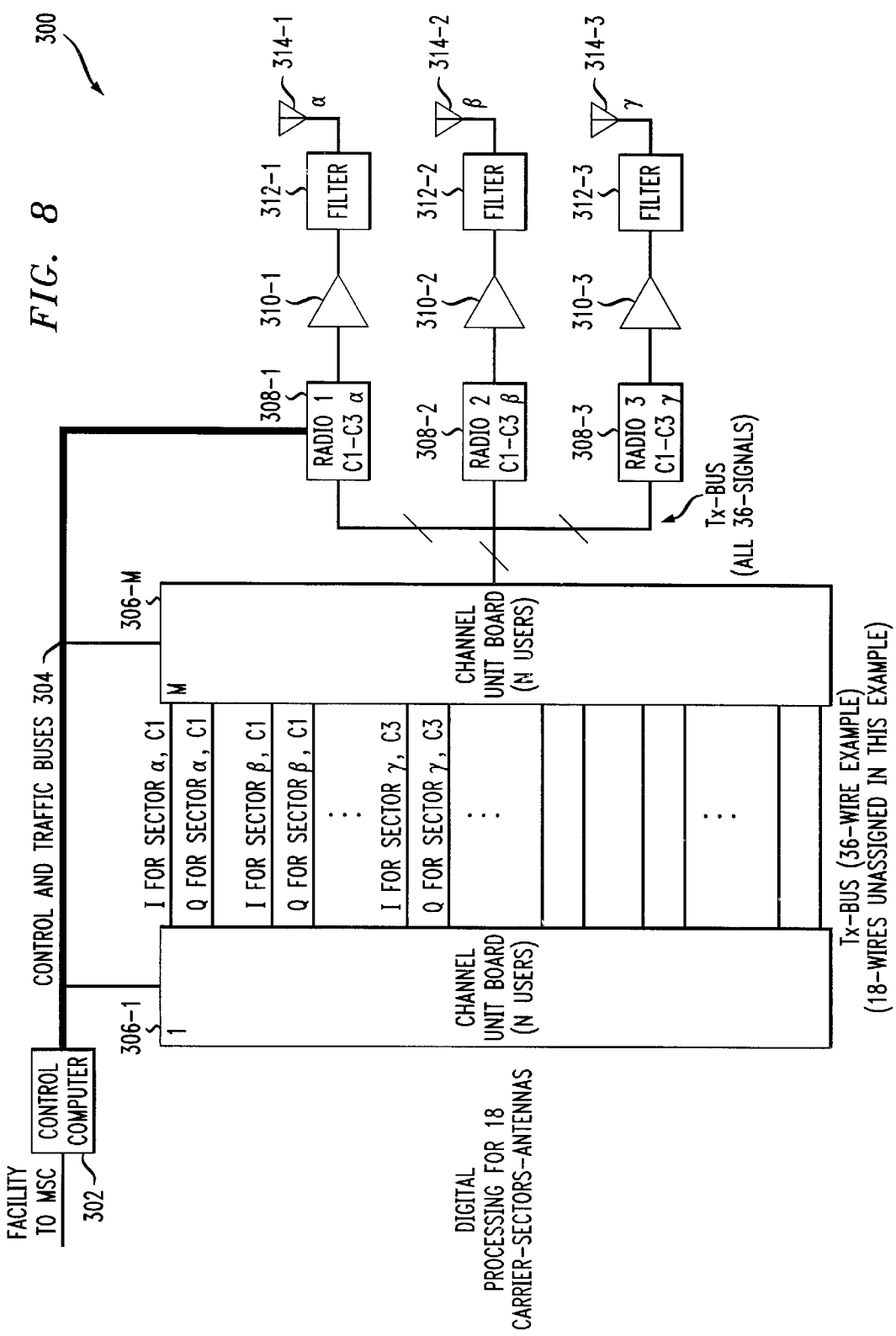

FIG. 8 shows the base station 300 as configured to support an MC cdma2000 signal. The control computer software configures a subset of channel unit boards 306 to provide the signal processing specified in the MC cdmt2000 standard. The software assigns signals to the wires of the 36-wire Tx-bus as follows: Tx-bus wires 1 and 2 for the I and Q signals, respectively, for carrier C1, sector α; Tx-bus wires 3 and 4 for I and Q signals, respectively, for carrier C1, sector β; and Tx-bus wires 5 and 6 for I and Q signals, respectively, for carrier C1, sector γ. Similarly, Tx-bus wires 7–12 are assigned to the MC cdma2000 carrier C2 I and Q signals, and Tx-bus wires 13–18 are assigned to the MC cdma2000 carrier C3 I and Q signals. In this example configuration, 18 of the Tx-bus wires remain unassigned.

Because this usage of Tx-bus wires and the form of the MC cdma2000 signals placed on them is consistent with an arrangement that can be used for three IS-95 CDMA carriers, the FIG. 8 configuration also allows the simultaneous configuration of another subset of the channel unit boards 306 to provide IS-95A, IS-95B, and/or IS-95C processing for this set of three CDMA carriers. In this case, the IS-95 digital I and Q signals and the MC cdma2000 digital I and Q signals are added together as the signals pass through each channel unit board, and the total air interface capacity of the three CDMA carriers is shared by the MC cdma2000 and IS-95 users.

In the FIG. 8 configuration, radio board 308-1 is configured to process the I and Q signals for the three CDMA carriers for sector α, radio board 308-2 is configured to process the I and Q signals for the three CDMA carriers for sector β, and radio board 308-3 is configured to process the I and Q signals for the three CDMA carriers for sector γ. The outputs of the radio boards 308-1, 308-2 and 308-3 are then amplified, filtered and radiated in a manner similar to that previously described in conjunction with FIG. 6.

The FIG. 8 configuration of the base station 300 consumes on each of the radio boards 308-1, 308-2 and 308-3 three of the six sector/carriers worth of processing capacity. The remaining processing capacity of the radio boards can be used to provide, e.g., another cdma2000 5 MHz signal, three separate IS-95 CDMA carriers, or an overlay of the two signal types. The control computer 302 may be used to configure the remaining channel unit boards to implement the desired arrangement, and also to configure the radio boards to perform the required processing on the designated Tx-bus signals.

Figure 9:
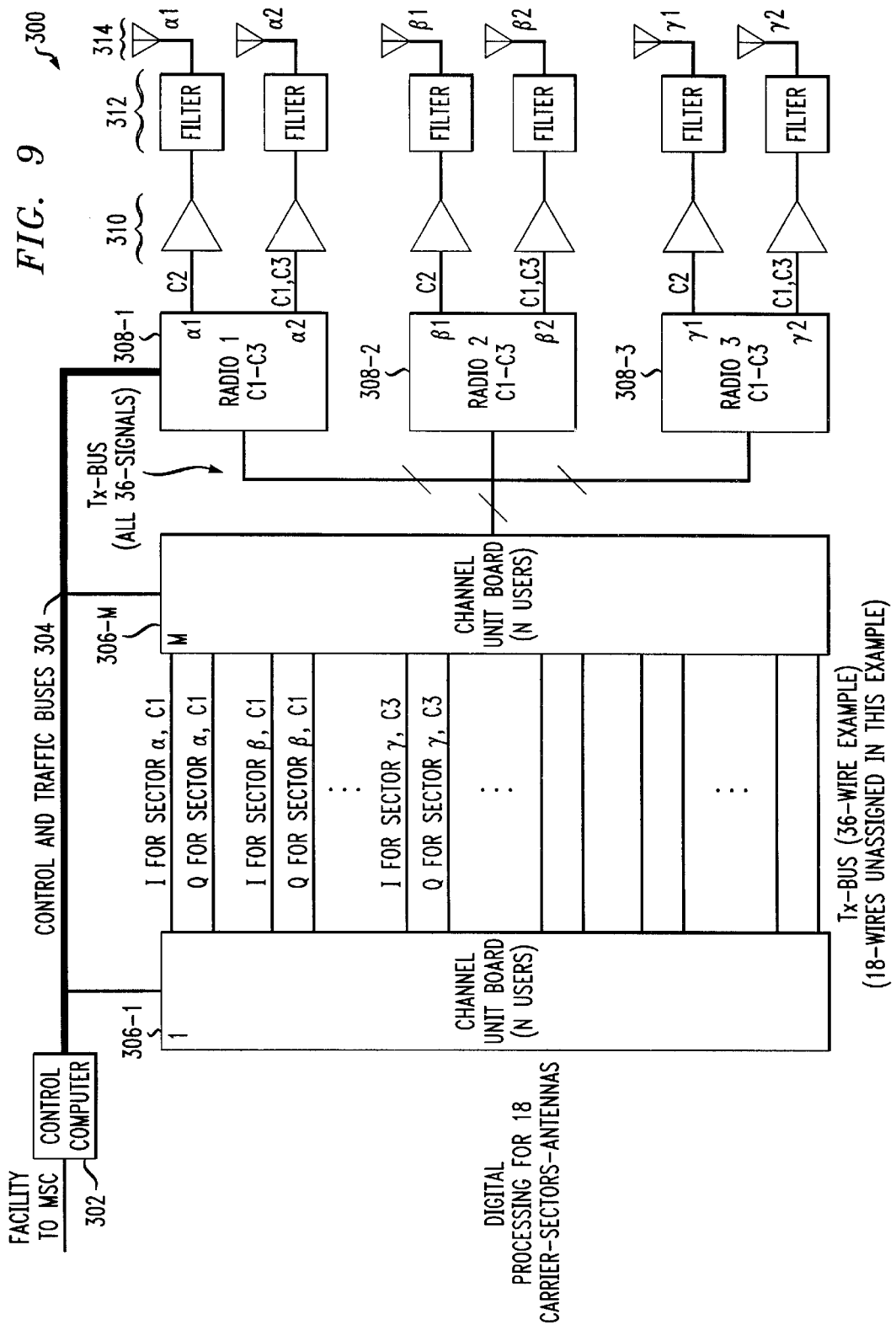

FIG. 9 shows another possible configuration of the base station 300. As previously noted, OTD is one method of achieving transmit diversity with a CDMA signal. The MC cdma2000 signal offers an alternative method that also can be implemented in the base station 300 in the manner illustrated in FIG. 9. Because three carriers are output in the MC cdma2000 approach, the radio boards 308-1, 308-2 and 308-3 for each sector can be programmed to process and combine carrier C1 and carrier C3 together, and to output their combined signal to one transmit amplifier 310, filter 312, and antenna 314 for the sector. The radio boards are also programmed to process carrier C2 through a second RF output port. This RF signal is input to a separate amplifier 310 and filter 312, and radiated from the corresponding antenna on the sector, i.e., antenna α1, β2 or γ1. As in the FIG. 8 configuration, 18 of the Tx-bus wires remain unassigned in the FIG. 9 configuration.

As a further illustration of the versatility of the reconfigurable base station 300 of the present inventions a configuration suitable for implementing the above-noted DS approach will now be described. In this case, each user signal is directly spread with a spreading signal that is three times the rate of the IS-95 spreading signal. The control computer therefore configures a subset of channel unit boards 306 to perform this type of processing on user signals for calls assigned to them. The processing on these channel unit boards produces digital I and Q signals, each with a rate three times that of the I and Q signals used in IS-95.

An example assignment of these higher rate signals to the Tx-bus wires is as follows: each channel unit board demultiplexers the summed digital I signals into three information streams per sector, and places each of the nine resulting bit streams onto one Tx-bus wire dedicated to that stream by the control computer configuration instructions. Similarly, the summed digital Q signal is demultiplexed by each DS channel unit board into three information streams per sector, and placed onto nine Tx-bus wires dedicated to these signals by the control computer configuration instructions. At its input ports, each channel unit board multiplexes the three I signals per sector into a single bit stream, and the three Q signals per sector into a signal bit stream from the preceding chancel unit board, and adds to these multiplexed streams the signals from users assigned to itself on each of the three sectors. The added signals per sector are then demultiplexed, and passed to the next channel unit board using-the Tx-bus wires dedicated to this purpose.

The control computer 302 configures the radio board dedicated to a particular sector to process the digital I and Q signals for that sector. From its input ports, the radio board first multiplexes together the three I signal components and the three Q signal components into single I and Q signal streams, and uses these streams to construct the wide band modulated low-power RF signal. The RF signal for a sector is then amplified, filtered, and radiated from a single antenna in the sector.

As in the case of the previously-described MC cdma2000 configuration, the remaining three sector/carriers of processing capacity on each radio board can be used to provide an additional cdma2000 carrier, and/or three IS-95 carriers.

A configuration of the base station 300 suitable for implementing the above-noted UMTS wide band CDMA standard will now be described. The baseband processing required for the UMTS standard is different from the processing required by the cdma2000 standard. This difference is contained within the digital channel unit boards, which in general are different for the two standards. Also, the UMIS standard uses a signal spreading rate that is different from that used in IS-95. The value in the UMTS case is either 4.096 Mcps, or 3.84 Mcps, rather than the 3.6864 Mcps used in the cdma2000 standard. A DS wide band signal is generated, just as in the previously-described DS approach, but the signal rates are different for the I and Q signals per sector. The different spreading rate is generated by a different clock circuit in the UMTS standard, compared with the cdmd2000 standard, but this difference does not impact the ability to reuse the base station 300 to implement either standard. The signal rate used on the Tx-bus is slightly different when the UMTS standard is implemented, versus when the cdma2000 standard is implemented, but the configuration given above for the DS approach applies also to the UMTS standard.

The base station 300 is configured to support the UMTS standard by mapping the spread spectrum I and Q signals of the UMTS standard for each sector onto the Tx-bus wires, such that demultiplexing/multiplexing processing can be performed to generate lower rate signals for transmission between channel unit boards. Different radio board processing is also required for the UMTS standard than for the cdma2000 standard, but, again, the above-described technique of configuring the radio boards to process the appropriate set of Tx-bus signals still applies. The RF signals per sector are amplified by power amplifiers, filtered, and radiated on an antenna per sector, in a manner similar to that previously described.

The present invention provides an improved base station design that can be configured by control computer software or via corresponding hard-wired implementations to support multiple CDMA standards Furthermore, these standards may be supported simultaneously within the same base station. In the case of conventional base stations, more than one base station design is typically required to support multiple standards, because a design made to support a given CDMA standard is generally not flexible enough to support the new features and bandwidths available in newer CDMA standards.

The reconfigurable base station design of the present invention allows cost-effective design and deployment of new standards-based capabilities, and also provides a space-efficient and low-cost mechanism by which network operators can upgrade their networks to provide enhanced standards-based capabilities. Additionally, if a deployed base station is targeted primarily to users of a newer version of the standard, it may be important to handle earlier versions of the standard as well. In this case, users with mobile units with capabilities limited to earlier versions can also be served when they roam into the serving area of the base station equipped for the newer version of the CDMA standard.

The above-described embodiments of the invention are intended to be illustrative only. For example, the number, type and arrangement of base station elements may be varied to accommodate particular applications. More specifically, the embodiments described above with reference to particular numbers of carriers, sectors and antennas are more generally applicable to use with any desired numbers K, S and A of carriers, sectors, and antennas, respectively. In addition, although the reconfiguration capabilities of the invention are illustrated with respect to transmit functions of a base station, it will be apparent to those skilled in the art that the techniques are also applicable to receive functions. These and numerous other alternative embodiments may be devised by those skilled in the art without departing from the scope of the following claims.

What is claimed is:

1. A base station for use in a wireless communication system, comprising:

a plurality of channel unit boards each providing processing operations for signals assigned to multiple carriers of the communication system;

a plurality of radio bards each generating a radio frequency (RF) output signal for each of at least a subset of the multiple carriers, and a bus interconnecting at least a subset of the channel unit boards with corresponding ones of the radio boards the bus having a plurality of signal lines for assignment to particular ones of the signals, wherein the base station is configured to implement a first assignment of the signal lines to the signals, and can be reconfigured to implement a different assignment of the signal lines to the signals.

2. The base station of claim 1 wherein the first assignment of the signal lines to the signals supports a first wireless communication standard, and a second assignment of the signal lines to the signals supports a second wireless communication standard.

3. The base station of claim 2 wherein the wireless communication system is a code division multiple access (CDMA) communication system, the first wireless communication standard is at least one of an IS-95A and an IS-95B standard, and the second wireless communication standard includes at least one of an IS-95C standard with Orthogonal Transmit Diversity (OTD), an IS-95C standard without OTD, a Multi-Carrier (MC) cdma2000 standard, and a Universal Mobile Telecommunications System (UMTS) standard.

4. The base station of claim 1 wherein each of the channel unit boards generates a pair of digital in-phase (I) and quadrature (Q) signals for each of the multiple carriers and for each of a plurality of antenna sectors of the base station.

5. The base station of claim 4 wherein the bus includes at least 2×K×S signal lines, with a given pair of the signal lines assigned to one of the pairs of digital I and Q signals generated for one of K carriers and for one of S antenna sectors, for a single antenna.

6. The base station of claim 5 wherein each of the radio boards generates an RF output signal for each of the K carriers for a given one of the S antenna sectors.

7. The base station of claim 4 wherein the bus includes at least 2×K×S×A signal lines, with a given pair of the signal lines assigned to one of the pairs of digital I and Q signals generated for one of K carriers, and for one of A antennas on each of S antenna sectors.

8. The base station of claim 7 wherein each of the radio boards generates a pair of RF output signals, one for each of the A antennas on a particular one of the S antenna sectors.

9. The base station of claim 7 wherein each of the radio boards generates an RF output signal for each of the K carriers for a given one of the S antenna sectors.

10. The base station of claim 7 wherein each of the radio boards generates a plurality of RF output signals, one for each of the A antennas on a particular one of the S antenna sectors, with the output signal for one of the antennas corresponding to a first one of the K carriers, and an output signal for the other antenna corresponding to at least a subset of the other K−1 carriers.

11. The base station of claim 1 further including a control computer, wherein a given one of the assignments of the signal lines to the signals is implemented at least in part under control of software running on the control computer.

12. The base station of claim 11 wherein the control computer includes software capable of implementing the first assignment and the different assignment.

13. The base station of claim 1 wherein a given one of the assignments of the signal lines to the signals is implemented at least in part by connecting particular signal lines to particular signal ports on the channel unit boards and radio boards.

14. A method of operating a base station for use in a wireless communication system, the base station comprising a plurality of channel unit boards each providing processing operations for signals assigned to multiple carriers of the communication system, and a plurality of radio boards each generating an RF output signal for each of at least a subset of the multiple carriers, the method comprising the step of:

assigning signal lines of a bus interconnecting at least a subset of the channel unit boards with corresponding ones of the radio boards, to particular ones of the signals, such that the base station is configured to implement a first assignment of the signal lines to the signals, and wherein the base station can be reconfigured to implement a different assignment of the signal lines to the signals.

15. The method of claim 14 wherein the first assignment of the signal lines to the signals supports a first wireless communication standard, and a second assignment of the signal lines to the signals supports a second wireless communication standard.

16. The method of claim 15 wherein the wireless communication system is a CDMA communication system, the first wireless communication standard is at least one of an: IS-95A and an IS-95B standard, and the second communication standard includes at least one of an IS-95C standard with OTD, an IS-95C standard without OTD, an MC cdma2000 standard, and a UMTS standard.

17. The method of claim 14 wherein the assigning step further includes assigning pairs of digital I and Q signals, generated by each of the channel unit boards for each of the multiple carriers and for each of a plurality of antenna sectors of the base station, to corresponding pairs of signal lines of the bus.

18. The method of claim 14 wherein the assigning step is implemented at least in part using software running on a control computer of the base station.

19. The method of claim 14 wherein the assigning step is implemented at least in part by connecting particular signal lines to particular signal ports on the channel unit boards and radio boards.

20. An article of manufacture comprising a machine-readable storage medium for storing one or more programs for use in configuring a base station of a wireless communication system, the base station comprising a plurality of channel unit boards each providing processing operations for signals assigned to multiple carriers of the communication system, and a plurality of radio boards each generating an RF output signal for each of at least a subset of the multiple carriers, the one or more programs when executed implementing the step of:

assigning signal lines of a bus interconnecting at least a subset of the channel unit boards with corresponding ones of the radio boards, to particular ones of the signals, such that the base station is configured to implement a first assignment of the signal lines to the signals, and wherein the base station can be reconfigured to implement a different assignment of the signal lines to the signals.

21. A base station for use in a wireless communication system, comprising:

a plurality of channel unit boards each providing processing operations for signals assigned to multiple carriers of the communication system;

a plurality of radio boards each generating an RF output signal for each of at least a subset of the multiple carriers;

a reconfigurable bus interconnecting at least a subset of the chancel unit boards with corresponding ones of the radio boards, the bus having a plurality of signal lines for assignment to particular ones of the signals; and a control computer coupled to at least a subset of the plurality of channel unit boards and the plurality of radio boards, the control computer being operative to configure the base station to support a particular wireless communication standard by controlling assignment of the signal lines to the signals.

22. An apparatus for use in a wireless communication system, comprising: a base station having a reconfigurable bus with a plurality of signal lines for assignment to particular signals, wherein the base station may be configured to support first and second wireless communication standards by implementing corresponding first and second assignments, respectively, of the signal lines to the signals the base station further comprising; plurality of channel unit boards each providing processing operations for signals assigned to multiple carriers of the communication system; and a plurality of radio boards each generating a radio frequency (RF) output signal for each of at least a subset of the multiple canrriers; the reconfigurable bus being adapted to provide controllable interconnection of at least a subset of the channel unit boards with at least a subset of the radio boards.

* * * * *

UNITED STATES PATENT AND TRADEMARK OFFICE
CERTIFICATE OF CORRECTION

PATENT NO. : 6,587,448 B1                                             Page 1 of 1
DATED       : July 1, 2003
INVENTOR(S) : Dajer et al.

It is certified that error appears in the above-identified patent and that said Letters Patent is hereby corrected as shown below:

Title page,
Item [57], ABSTRACT,
Line 11, please delete "stations" and insert -- station is --
Line 16, please delete "to"
Line 16, please delete "QTD" and insert -- OTD --
Line 17, please delete "cdma2009" and insert -- cdma2000 --
Line 18, please delete "System, (UMTS) by assigning." and insert -- System (UMTS), by assigning --

Column 14,
Line 33, insert a new paragraph after "comprising:"
Line 38, insert -- ; -- after "signals"
Line 38, insert a new paragraph after "signals;"
Line 39, delete ";" and insert -- : --
Line 39, insert a new paragraph after ":"
Line 39, insert -- a -- before "plurality"
Line 42, insert a new paragraph after "and"
Line 44, delete "canrriers;" and insert -- carriers; --
Line 44, insert a new paragraph after "carriers;"

Signed and Sealed this

Twenty-third Day of March, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,587,448 B1
DATED : July 1, 2003
INVENTOR(S) : Dajer et al.

It is certified that error appears in the above-identified patent and that said Letters Patent is hereby corrected as shown below:

Drawings,
Fig. 6, please delete "PRIOR ART".
Fig. 7, please delete "PRIOR ART".

Signed and Sealed this

Twentieth Day of July, 2004

JON W. DUDAS
*Acting Director of the United States Patent and Trademark Office*